(12) United States Patent
Eischeid et al.

(10) Patent No.: US 9,600,103 B1
(45) Date of Patent: Mar. 21, 2017

(54) METHOD FOR ENSURING USE INTENTIONS OF A TOUCH SCREEN DEVICE

(71) Applicant: ALLSCRIPTS SOFTWARE, LLC, Chicago, IL (US)

(72) Inventors: Todd Michael Eischeid, Cary, NC (US); David Windell, Raleigh, NC (US)

(73) Assignee: ALLSCRIPTS SOFTWARE, LLC, Chicago, IL (US)

( * ) Notice: Subject to any disclaimer, the term of this patent is extended or adjusted under 35 U.S.C. 154(b) by 633 days.

(21) Appl. No.: 13/840,989

(22) Filed: Mar. 15, 2013

Related U.S. Application Data (63) Continuation of application No. 13/732,304, filed on Dec. 31, 2012, now abandoned.

(60) Provisional application No. 61/748,014, filed on Dec. 31, 2012.

(51) Int. Cl.
| | | |
|---|---|---|
| *G06F 3/041* | (2006.01) | |
| *G06F 3/0481* | (2013.01) | |
| *G06F 3/0482* | (2013.01) | |
| *G06F 3/0488* | (2013.01) | |

(52) U.S. Cl.
CPC .......... *G06F 3/041* (2013.01); *G06F 3/04817* (2013.01); *G06F 3/0416* (2013.01); *G06F 3/0482* (2013.01); *G06F 3/0488* (2013.01); *G06F 3/04886* (2013.01)

(58) Field of Classification Search
CPC .. G06F 3/04886; G06F 3/0488; G06F 3/0482; G06F 3/0416; G06F 3/041; G06F 3/04817

USPC .......................................................... 715/810
See application file for complete search history.

(56) References Cited

U.S. PATENT DOCUMENTS

| | | | | |
|---|---|---|---|---|
| 6,504,530 | B1 * | 1/2003 | Wilson .................. | G06F 3/0418 345/173 |
| 2002/0077886 | A1 * | 6/2002 | Chung ............... | G06K 7/10336 705/12 |
| 2007/0101297 | A1 * | 5/2007 | Forstall ............... | G06F 3/04817 715/841 |
| 2009/0135147 | A1 * | 5/2009 | Hsu et al. ...................... | 345/173 |
| 2010/0333030 | A1 * | 12/2010 | Johns .................. | G06F 3/04815 715/834 |
| 2011/0035708 | A1 * | 2/2011 | Damale ........................ | 715/863 |

(Continued)

*Primary Examiner* — David Spellman
(74) *Attorney, Agent, or Firm* — Tillman Wright, PLLC; Chad D. Tillman; Jeremy C. Doerre (57) ABSTRACT

A method for facilitating the validation of an action by a user utilizing a touch screen device having a processor executing software commands includes providing an initial screen via a GUI displaying certain data fields and functional icons of a particular application. On the touch screen an initial active area is designated in association with certain data fields and functional icons. An end user interacts with the touch screen device generating an input signal. The input signal is received from the touch screen active area by the processor requesting an action. Upon receipt of the input signal, a validation active area on the touch screen is visually displayed. The validation active area is monitored for a secondary input signal generated by an end user interacting with the validation active area. The initial active area is monitored for determining an input signal in association with the initial active area is present.

20 Claims, 7 Drawing Sheets

(56) References Cited

U.S. PATENT DOCUMENTS

| | | | |
|---|---|---|---|
| 2011/0242022 A1* | 10/2011 | Wen | G06F 3/0416 345/173 |
| 2012/0322380 A1* | 12/2012 | Nannarone et al. | 455/41.2 |
| 2013/0278526 A1* | 10/2013 | Zhu | G06F 3/0416 345/173 |
| 2014/0168110 A1* | 6/2014 | Araki | G06F 3/016 345/173 |

* cited by examiner

METHOD FOR ENSURING USE INTENTIONS OF A TOUCH SCREEN DEVICE

CROSS-REFERENCE TO RELATED APPLICATION

The present application is a U.S. continuation patent application of, and claims priority under 35 U.S.C. §120 to U.S. patent application Ser. No. 13/732,304, filed Dec. 31, 2012, which patent application is incorporated by reference herein; and the present application is a U.S. nonprovisional patent application of, and claims priority under 35 U.S.C. §119(e) to, U.S. provisional patent application Ser. No. 61/748,014, filed Dec. 31, 2012; which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to user interfaces. Computer applications are widely used to assist service providers and other end users in managing tasks of varying types. Increasingly, such applications are being utilized with touch screen devices.

A need exists for improvement in ensuring the intention of a user utilizing a touchscreen device. This, and other needs, are addressed by one or more aspects of the present invention.

SUMMARY OF THE INVENTION

The present invention includes many aspects and features. Moreover, while many aspects and features relate to, and are described in, a healthcare context, the present invention is not limited to use only in this context, as will become apparent from the following summaries and detailed descriptions of aspects, features, and one or more embodiments of the present invention.

One aspect of the present invention relates to a method for facilitating the validation of an action by a user utilizing a touch screen device having a processor executing software commands comprising the steps of providing an initial screen via a GUI displaying certain data fields and functional icons of a particular application. On the touch screen an initial active area is designated in association with certain data fields and functional icons. An end user interacts with the touch screen device generating an input signal. The input signal is received from the touch screen active area by the processor requesting an action. Upon receipt of the input signal, a validation active area on the touch screen is visually displayed. The validation active area is monitored for a secondary input signal generated by an end user interacting with the validation active area. The initial active area is also continuously monitored for determining if an input signal in association with the initial active area is present. The requested action of the original input signal is processed if an input signal from the initial active area and validation area are simultaneously present.

In addition to the aforementioned aspects and features of the present invention, it should be noted that the present invention further encompasses the various possible combinations and sub combinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

FIGS. 4A-7C illustrate various methodologies in accordance with one or more preferred implementations.

DETAILED DESCRIPTION

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

One or more preferred implementations relate to a system and method for verifying the intention of an end user when utilizing a hand held device utilizing software controls. In particular, certain electronic handheld devices such as portable notebooks, tablets such as an IPAD or smartphone such as an IPHONE have the capabilities of running applications having general and specific purposes. These devices may also be designated to control equipment. These devices commonly utilize detailed displays or screens which provide information to the end user. The methods and layout of the screen to provide the information to the end user is generally identified as a "Graphical User Interface" of "GUI". GUIs present the information to the end user in a particular manner. For many applications, GUIs are presented utilizing "touch screens". Touch screens provide designated active areas where interaction with the display screen at a pre-defined location functions as an "input" to the underlying application software. As is customary with software, inputs are utilized to direct the special purpose computer to perform subsequent tasks based upon the input signal received.

Touch screens are generally a display screen that is sensitive to the touch of a finger or stylus. Generally an icon or such is displayed in an "active area". The icon is representative of a physical button or other control feature and the associated software is programmed to accept interaction with the icon as being representative of a command. For example, a touch screen might digitize the point of contact on the screen into an X-Y coordinate wherein the x-y coordinate is utilized by the underlying application as an input signal to process an associated command.

Handheld portable electronic mobile devices with computational abilities running applications have enabled users to utilize these devices in new settings. One such setting includes medical clinics, hospitals and the like where such devices may also control equipment through Bluetooth transmissions or the like. Contemporary medical equipment which is designed to be more stationary for a particular location may also include a touch screen affiliated with the equipment.

In a clinical setting, an application may be utilized which is related to a patient and the respective care the patient is receiving. For instance, an application may include a GUI which includes a general screen which displays non-transitory information such as the patient's name, age, primary physician, and the like. From this initial touch screen, certain icons may be present that may lead an attendant to the prescriptions for the particular patient, and/or a time line of the application of the prescribed prescriptions. General information relating to the patient may be obtained in this manner.

In the preferred embodiment, the GUI will utilize screens which may control equipment. For instance, a ventilator having multiple functions may be utilized. One such ventilator is disclosed in U.S. Pat. No. 6,543,449 entitled Medical Ventilator incorporated herein by reference. As disclosed, the ventilator may be utilized in an invasive and non-invasive environment with separate controls related to each functionality. As disclosed in relation to the patent a GUI includes a plurality of buttons for selecting the desired mode of operation. In the preferred embodiment, the GUI includes a volume ventilation button, pressure ventilation button, non-invasive ventilation button, and alarm button. In one embodiment, the graphical user interface has an infrared touch screen that allows the operator to select and display the ventilator settings.

The volume ventilation button is activated to view the settings for volume ventilation which is volume ventilation display. The volume ventilation display displays the various parameters related to volume ventilation. Preferably, the volume ventilation display includes: an A/C button, a SIMV button, and a CPAP button. The various parameters utilized for controlling the operation of ventilation. For volume ventilation, such controls include a breath rate button, tidal volume button, peak flow button, PEEP button, PSV button, I-trigger button, E-trigger button and rise time button. The current active state of ventilation is displayed by state button. When the active state is volume assist/control, the A/C button is used in conjunction with the I-trigger sensitivity setting to deliver mandatory or assisted breaths. If only machine-triggered mandatory breaths are desired, the operator can set the mode to assist and set I-trigger to the maximum setting. If assisted breaths are desired, the operator can set the mode to A/C and I-trigger to match the patient's respiratory demand. SIMV allows the operator to select a mandatory breath rate. This mode will allow patient-initiated, spontaneous breaths. Mandatory volume-controlled ventilation is also available in this mode. Pressure support ventilation is also allowed in this mode. CPAP delivers spontaneous breaths.

A rate button determines the number of mandatory breaths per minute for mandatory breaths. This setting is used to determine the frequency of mandatory breaths. In a preferred embodiment acceptable inputs for the breath rate are one to eighty breaths per minute. Tidal volume button controls the volume of gas delivered to the patient during a mandatory, volume-controlled breath. Acceptable ranges are fifty milliliters to two point five liters. Peak flow button determines the maximum rate of gas volume delivery from the ventilator during mandatory, volume-based breaths. In the preferred embodiment, the setting ranges extend from three to one hundred and forty liters per minute. PEEP button is the operator-selected, positive pressure maintained in the circuit during the expiratory portion of a breath cycle. In the preferred embodiment, the settings may range between zero to thirty five centimeters $H_2O$. PSV button provides positive pressure to the patient's airway during a spontaneous breath. In the preferred embodiment, the settings range between zero to one hundred centimeters $H_2O$. I-trigger button is the level of pressure or flow required to initiate an inspiration. E-trigger button is a percent of peak inspiratory flow that, when reached, causes the system to transition from inhalation to exhalation. Rise time button is used to vary the rate of change and the amount of pressure delivered during inspiration during pressure support breath delivery.

Accordingly, in operation, if an operator desires to operate ventilator in a volume control mode, the operator will first select volume ventilation button which then displays volume ventilation display. At this time, any parameters shown by volume ventilation display may be manipulated. The operator then subsequently activates alarm button to enter into the alarm display for volume ventilation. Upon verifying the accuracy of the various alarm buttons, the operator will then activate activation button and the machine will then enter into volume ventilation mode. If the active mode is already volume control ventilation, then activate button will merely indicate that the volume control alarms are active.

The GUI would display different touch screen displays when pressure ventilation mode is active. In the pressure ventilation mode, various modes of pressure ventilation may be provided by ventilator A including assist/control pressure ventilation, SIMV pressure ventilation and CPAP. In an embodiment, the various buttons for pressure ventilation include: the breath rate button, pressure button, I-time button, PEEP button PSV button, I-trigger button, E-trigger button, and rise time button.

Pressure buttons determine the pressure target to be delivered during mandatory or assist breaths. Preferable setting ranges extend from zero to one hundred centimeters $H_2O$. I-time button setting is used to vary the amount of time spent in the inspiratory phase of the breath cycle and the preferred ranges vary from point one to nine point nine seconds. PSV button provides positive pressure to the patient's airway during a spontaneous breath and the preferable settings range from zero to one hundred centimeters $H_2O$.

Various alarms may be included such as apnea interval, high pressure, low pressure, low PEEP, low tidal volume on a mandatory exhaled tidal volume and a low range limit on spontaneous exhaled tidal volume, high exhaled minute volume and low exhaled minute volume. Each of these alarms has a related button enabling the operator to select the alarm condition parameter.

As can be seen, in the clinical setting as described with respect to ventilators, and others, there are many situations in which the clinician makes decisions what would have very serious safety ramifications if they made the wrong decision. There are similarly many decision points in medical software where the clinician is executing an action. As it becomes more customary to utilize touch screen technology, it is helpful to facilitate confirmation of the intentions of an operator when interacting with controls to ensure that the respective "touching" of a designated active area was indeed intended and not merely the result of an inadvertent movement. One or more preferred implementations offer a way to ensure that the user's actions are intentional.

In a preferred implementation, a user places their finger on a touch screen interface, on a control that would typically initiate an action, such as a "Delete" button that would permanently delete some item. Depending on the action initiated, various "affirmation" processes may be engaged to verify the intention of the end user in the requested action. These subsequent "affirmation" processes are preferably undertaken with the original GUI screen displayed so that the user may still visually recognize the original icon activated and any related information currently displayed on the screen. By maintaining the GUI interface intact, and not transferring to a second screen, the end user is maintained in current environment which maintains consistency. The subsequent "affirmation" processes for verifying the intention of the end user may be dependent on the severity of the task at hand. It will be understood that in the clinical environment, very serious safety ramifications may occur if a wrong decision or activity was processed by the system by an inadvertent "touching" of the GUI.

Figure 1:
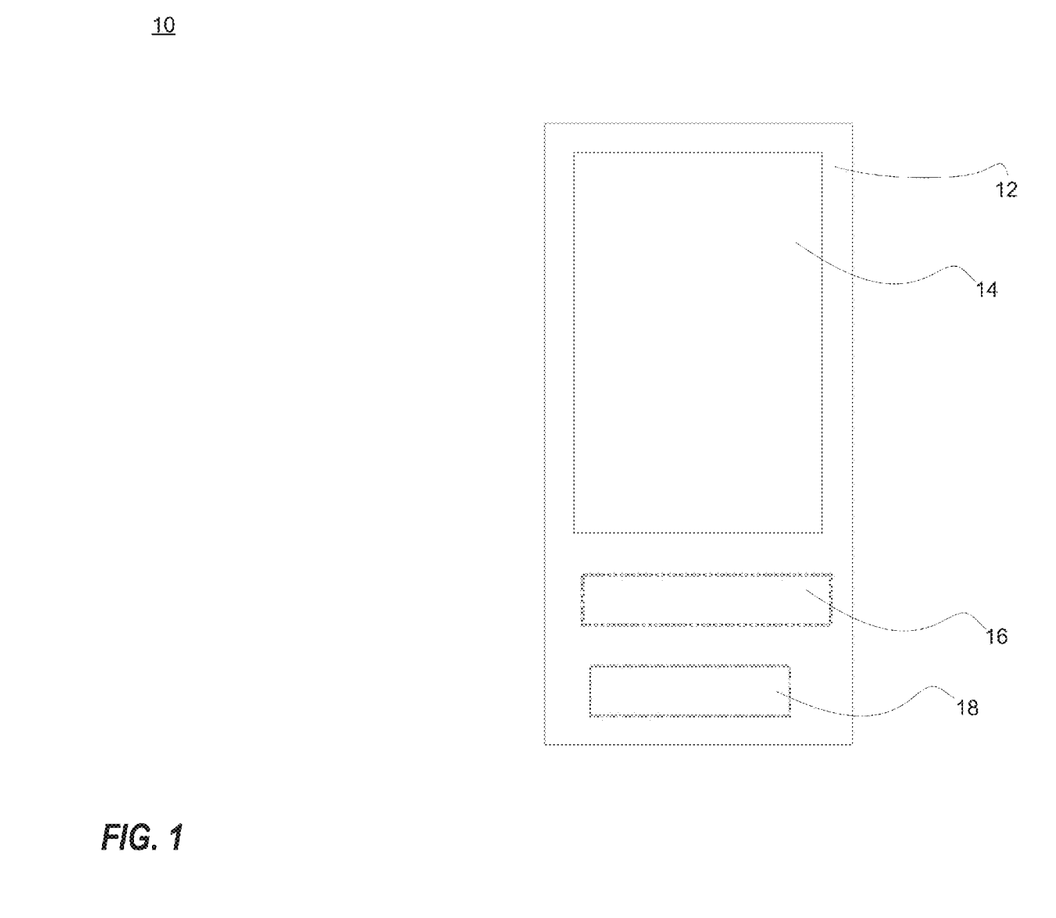
FIG. 1 is a schematic illustration of an exemplary device in accordance with one or more preferred implementations.

In a preferred implementation, a system and method are provided for verifying the intentions of a user's actions with respect to a "touch screen" device running a software application and utilizing a GUI which visually presents both information, content and control icons. FIG. 1 is a schematic illustration of an exemplary such touch screen device 10 which includes a housing 12, a touch screen interface 14, a processor 18, and memory 16.

Exemplary technologies utilized for touch screen 14 might include, for example, resistive, capacitive, projected capacitive, or a technology associated with acoustic and infrared waves, although it will be appreciated that other technologies might be utilized as well. A description of some of these exemplary technologies will now be provide.

Resistive: Resistive screens are pressure sensitive. They use two active layers: a flexible plastic layer on top of a rigid plastic or glass layer, with insulated spacers in between. The layers are coated with indium tin oxide, and different voltages are applied across the coatings, typically alternating between the layers. When touched, the front layer picks up the voltage from the back, and the back layer picks up the voltage from the front, enabling the controller to determine the X-Y location.

Capacitive: A capacitive methodology uses a single metallic-coated glass panel, which allows more light through than the resistive method. Voltage is applied to the corners of the screen, and when a finger touches the screen, it draws a tiny amount of current. The controller computes the X-Y location from the change in capacitance at the touch point. In addition, a special stylus that absorbs electricity can be used such as a touch pen.

Projected Capacitive: This capacitive variation uses a sensor grid sandwiched between two glass layers and allows for two-finger gestures such as pinching an image to make it smaller. When the screen is touched, the controller computes the X-Y location from the change in capacitance in the grid.

Acoustic Waves and Infrared: In this methodology, acoustic waves or infrared signals are transmitted across the screen's external surface from the top and side. Such systems are typically used for interfaces with larger buttons.

Figure 2:
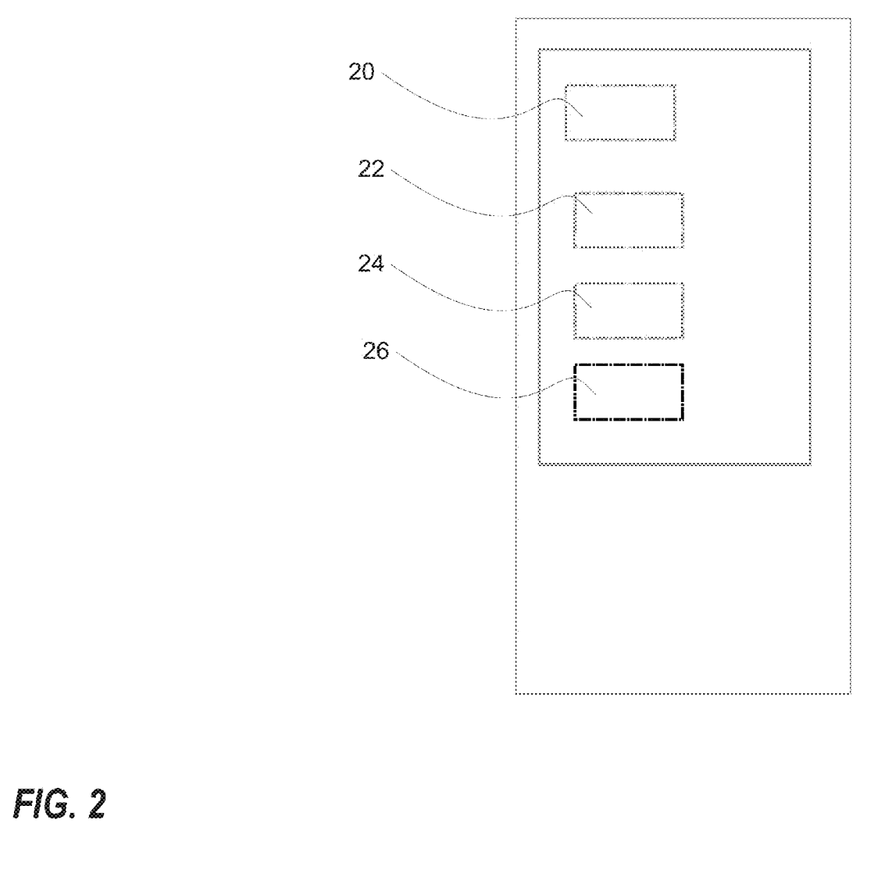
FIG. 2 illustrates a schematic of a device in accordance with one or more preferred implementations.

In one or more preferred implementations, with respect to a touchscreen device such as that illustrated in FIG. 1, an application displays different content via a GUI on a touch screen in designated active zones wherein depending on the type of touch screen utilized, certain activity within this designated area at the respective X/Y coordinate will constitute a "selection" or input into the application and subsequent commands will be initiated. In one or more implementations, respective icons will fall into a class system. For example, as illustrated in FIG. 2, a first icon or active area 20 may be associated with a Class 1 activity, a second icon or active area 22 may be associated with a Class 2 activity, a third icon or active area 24 may be associated with a class 3 activity, and a fourth icon or active area 26 may be associated with a class 4 activity.

Separating the icons or active areas into different classes enables the application to administer varying degrees of "intentional" action verifications. For instance, certain activity may constitute merely record keeping or administrative tasks such as checking a patient's prescription schedule. Once this activity has been reviewed by a practitioner, the practitioner may merely want to move onto another screen of the GUI and replace the prescription schedule with another activity. This step of merely hiding a screen or pulling additional information up for viewing is merely routine. In this event, it may not be necessary to request verification of the user's intent as such activity is not potentially injurious to the patient. However, as related to incorporation into a medical ventilator, certain settings that might be adjusted an operator may be life threatening if erroneously altered. In a preferred implementation, depending on the severity of the consequences to the patient, the actions will require distinct verifications of the intentions. Thus, in one or more preferred implementations, a system identifies different classifications of inputs depending on the consequence of underlying actions and incorporates different degrees of "verification" of the intentions of the end user which require different levels of concentrated effort to undertake.

Figure 3:
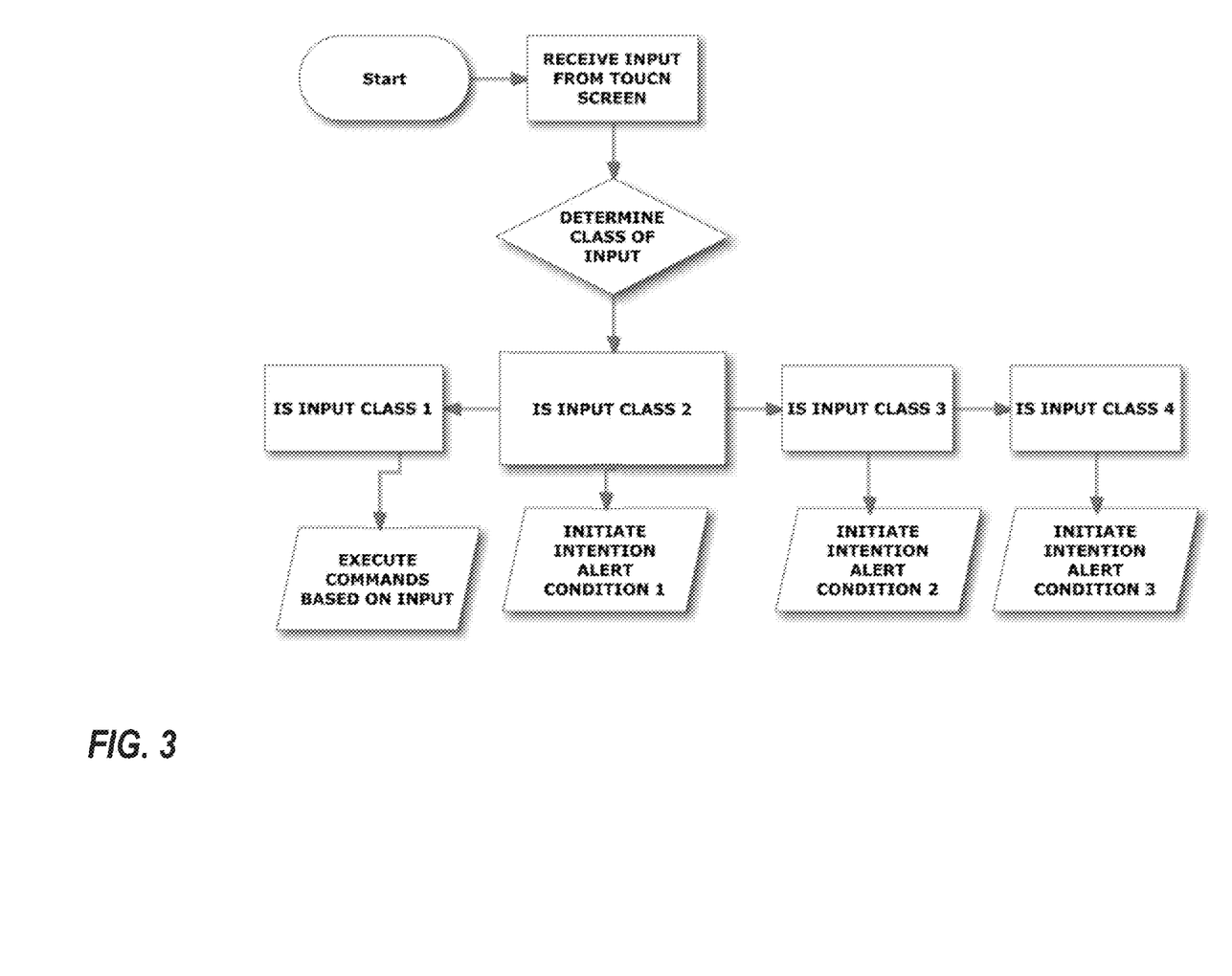
FIG. 3 is a flow chart illustrating methods of initiating a request for ensuring the intentions of a user in accordance with one or more preferred implementations.

FIG. 3 illustrates a flow chart of a methodology in accordance with one or more implementations. At the start of the process, the operator has engaged in the underlying activity which results in the "touch screen" producing an input signal. For instance, returning to the example of FIG. 2, one of the icons or active areas of 20, 22, 24 or 26 may be activated. As previously mentioned, in this illustration, each activation of an icon results in an action to be undertaken by the underlying software application which has differing consequences. Accordingly, each icon has been designated with a respective attribute identifying that such activation falls into a predefined classification. Hence, the first step to be undertaken is the identification of the respective input class. In the illustration provided, four distinct classes have been established within a hierarchy of differing results with class 1 as an illustration being of an inconsequential result to the patient and class 4 being the most damaging. Each of these respective classes has a corresponding intention alert action which requires subsequent action by the end user. Accordingly, as shown in FIG. 3, the method includes determining the class of the input and once the class has been identified initiating the respective intentional alert condition associated with the respective class.

Figure 4A:
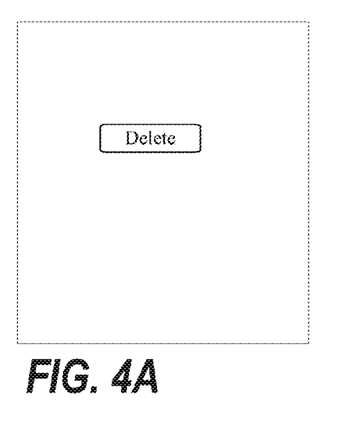
Figure 4B:
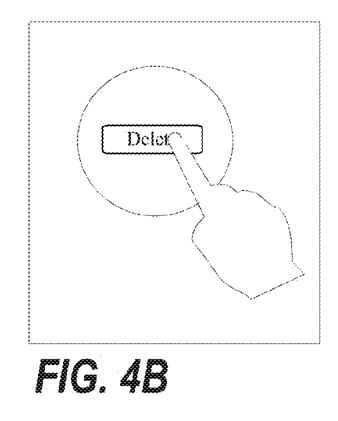
Figure 4C:
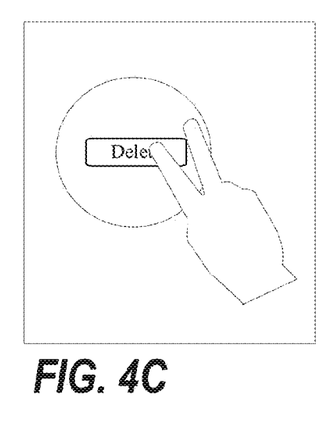

FIG. 4 illustrates one or more preferred methodologies in accordance with one or more implementations.

In one or more preferred implementations, a user places their finger on a touch screen interface designating an action, such as, for example, a "delete" action that would permanently delete some item. This type of button is shown in FIG. 4A and could include, for example, a Class 2 designation. In response to user engagement with the button of FIG. 4A, the GUI presents a new action area, as illustrated in FIG. 4B. This new action area can be characterized as an "intention alert condition" associated with a Class 2 designation. In the figure as shown, this new action area overlays the initial GUI so the original content is still visible, however, in at least some implementations, one or more original action areas of the GUI are inactive (preferably, at least those underlying the newly presented action area). Preferably, should the user intend to continue with the Class 2 designated activity, the user is required to engage the newly active intention alert condition area, as illustrated in FIG. 4C. In the implementation shown, the new active area is a circular (optionally translucent) area which has been established around the control. This provides a visual indication to the user that the additional action is required to continue with the execution of the requested command. Interaction with this intention alert condition confirms the intention of the user and executes the command. In this instance, the second touch in the circular area completes the confirmation of the action. In at least some implementations, the action will be initiated immediately upon confirmation, while in at least some implementations when the user lifts both fingers the action will be executed.

Figure 5A:
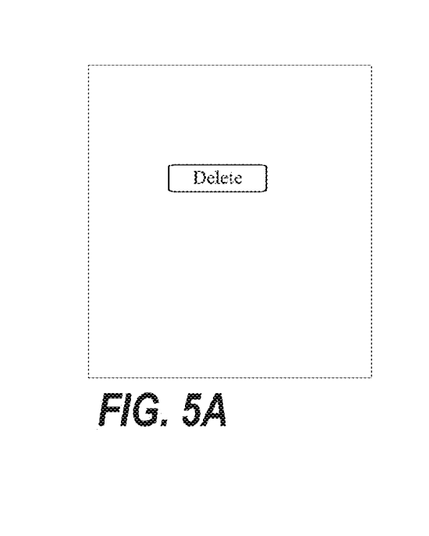
Figure 5B:
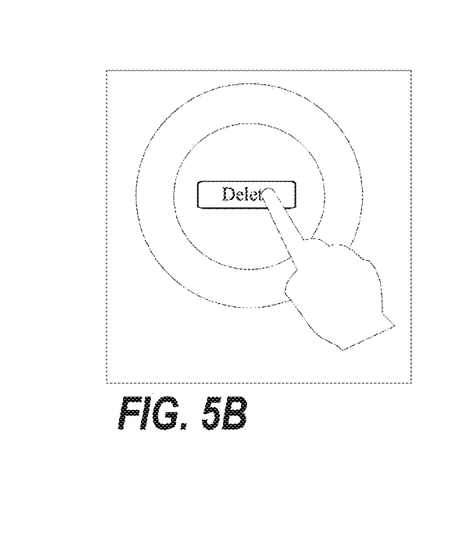
Figure 5C:
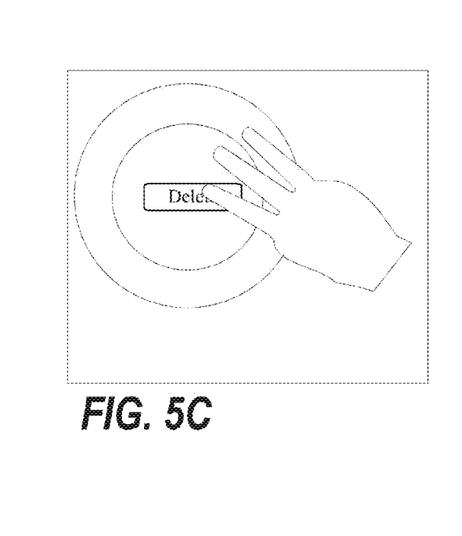

FIGS. 5A-C illustrate a similar methodology to that illustrated in FIGS. 4A-C. FIG. 5A-C illustrate a methodology requiring additional user action over and above that required by the methodology described above and illustrated in FIGS. 4A-C. This methodology might be, for example, a methodology in accordance with a class 3 designation.

As illustrated in FIG. 5B, this methodology includes multiple verification areas, thus requiring the end user to activate three distinct areas. In one or more preferred implementations, as with the implementation illustrated in FIGS. 4A-C, the intention verification is identified with a (optionally translucent) overlay enabling the end user to maintain visual contact with the original GUI assisting in communicating with the end user the original desired action.

Figure 6A:
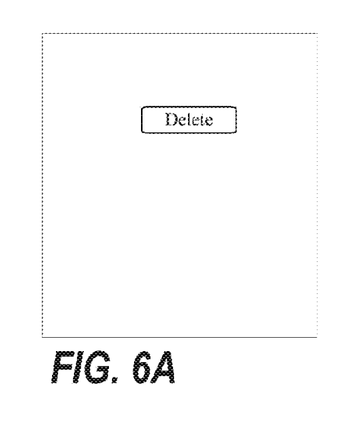
Figure 6B:
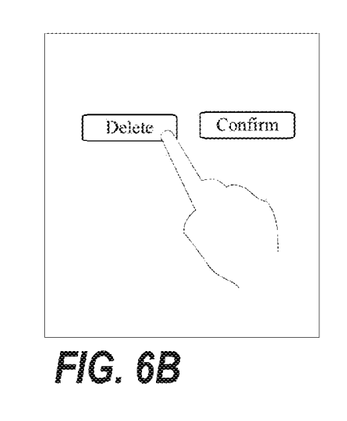
Figure 6C:
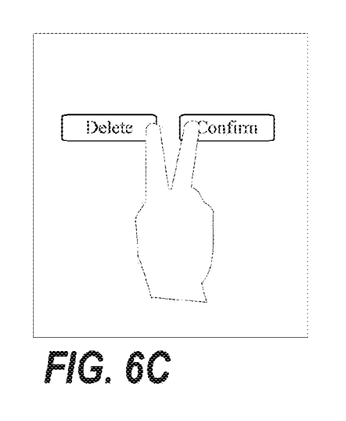

FIGS. 6A-C illustrate an alternative methodology in accordance with one or more preferred implementations. As seen in these figures, a second button is established similar to the overlay of FIGS. 4A-C, however the buttons are positioned offset from one another rather than adjacent. Such a methodology may be utilized for a different class of intention validation requiring the end user to make an additional effort to actuate both active areas simultaneously.

Figure 7A:
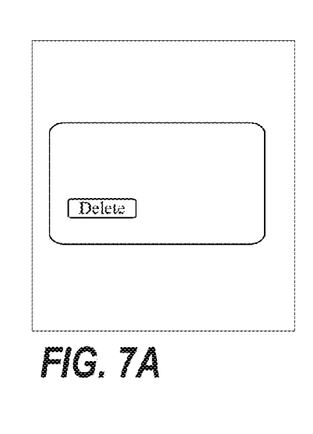
Figure 7B:
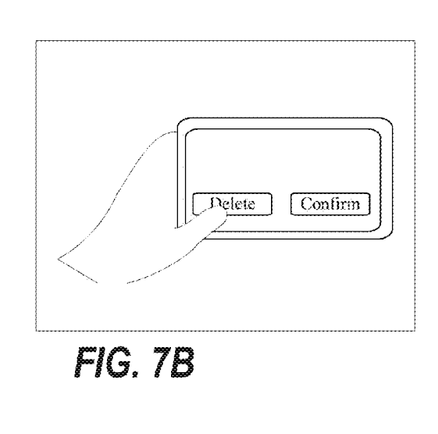
Figure 7C:
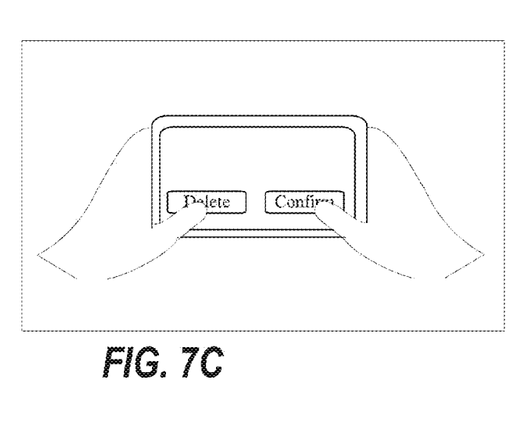

FIGS. 7A-C illustrate another alternative methodology in accordance with one or more preferred implementations. As illustrated, in these figures, a different class of intention validation produces a validation area which is significantly offset from the original desired action such that both hands are required to confirm the action. Such a methodology might be utilized, for example, for a class of actions which can potentially have severe consequences in try to minimize the chance of an accidental action.

Preferably, in the illustrated examples, an original action is not executed unless the secondary intentional action condition is also satisfied. In one or more preferred implementations, if the secondary intentional action condition is not satisfied within a predetermined timeframe, the original action request will be ignored and the software will reset to a state prior to the actuation of the initial icon (e.g. the GUI might display the screen which pre-existed prior to the initial actuation of the original icon).

In one or more preferred implementations, by requiring secondary actions in response to an initial request, the intent of a user is ascertained. In particular, with a touch screen device, certain areas of the touch screen are designated as "validation" areas depending on the initial classification of the requested action. In some preferred implementations, actions which may produce a more serious effect (e.g. on a patient) require a more strenuous verification process for the end user by positioning validation areas in different manners on the touch screen.

Aspects and features in accordance with one or more preferred implementations are described in the appendix attached hereto, which appendix is incorporated herein by reference.

Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A method for validating an action of a user utilizing a touch screen device having a processor executing software commands, the method comprising:
   (a) displaying, to a user via a touchscreen display of an electronic device, a graphical user interface of a medical software application comprising a plurality of data fields and functional icons including a first functional icon associated with a first action;
   (b) receiving, from the user via the touchscreen display of the electronic device, first touch input in the form of engagement by a first digit of the user with a portion of the touchscreen display displaying a first functional icon of the functional icons;
   (c) updating the displayed graphical user interface of the medical software application to include
      (i) a first action confirmation area surrounding the first functional icon, and
      (ii) a second action confirmation area surrounding the first action confirmation area;
   (d) while continuing to receive the first touch input, receiving, from the user via the touchscreen display of the electronic device, second touch input in the form of engagement by a second digit of the user with a portion of the touchscreen display displaying the first action confirmation area;
   (e) while continuing to receive the first touch input and the second touch input, receiving, from the user via the touchscreen display of the electronic device, third touch input in the form of engagement by a third digit of the user with a portion of the touchscreen display displaying the second action confirmation area;
   (f) in response to overlapping receipt of the first touch input, the second touch input, and the third touch input, effecting performance of the first action associated with the first functional icon.

2. The method of claim 1, wherein the first functional icon comprises a delete icon.

3. The method of claim 2, wherein the first action comprises a delete action.

4. The method of claim 1, wherein the first action comprises adjusting settings on a medical device.

5. The method of claim 1, wherein the first action comprises adjusting settings for a medical ventilator.

6. The method of claim 1, wherein the first action confirmation area is circular and encircles the first functional icon.

7. The method of claim 6, wherein the second action confirmation area is circular and encircles the first action confirmation area.

8. The method of claim 1, wherein the first action confirmation area is translucent.

9. The method of claim 1, wherein the second action confirmation area is translucent.

10. A method for validating an action of a user utilizing a touch screen device having a processor executing software commands, the method comprising:
    (a) displaying, to a user via a touchscreen display of an electronic device, a graphical user interface of a medical software application comprising a plurality of data fields and interface buttons including a first interface button associated with a first action;
    (b) receiving, from the user via the touchscreen display of the electronic device, first touch input in the form of engagement by a first digit of the user with a portion of the touchscreen display displaying a first interface button of the interface buttons;
    (c) updating the displayed graphical user interface of the medical software application to include
       (i) a first action confirmation area surrounding the first interface button, and
       (ii) a second action confirmation area surrounding the first action confirmation area;
    (d) while continuing to receive the first touch input, receiving, from the user via the touchscreen display of the electronic device, second touch input in the form of engagement by a second digit of the user with a portion of the touchscreen display displaying the first action confirmation area;
    (e) while continuing to receive the first touch input and the second touch input, receiving, from the user via the touchscreen display of the electronic device, third touch input in the form of engagement by a third digit of the user with a portion of the touchscreen display displaying the second action confirmation area;
    (f) in response to overlapping receipt of the first touch input, the second touch input, and the third touch input, effecting performance of the first action associated with the first interface button.

11. The method of claim 10, wherein the first interface button comprises a delete button.

12. The method of claim 11, wherein the first action comprises a delete action.

13. The method of claim 10, wherein the first action comprises adjusting settings on a medical device.

14. The method of claim 10, wherein the first action comprises adjusting settings for a medical ventilator.

15. The method of claim 10, wherein the first action confirmation area is circular and encircles the first interface button.

16. The method of claim 15, wherein the second action confirmation area is circular and encircles the first action confirmation area.

17. The method of claim 10, wherein the first action confirmation area is translucent.

18. The method of claim 10, wherein the second action confirmation area is translucent.

19. A method for validating an action of a user utilizing a touch screen device having a processor executing software commands, the method comprising:
   (a) displaying, to a user via a touchscreen display of an electronic device, a graphical user interface of a software application comprising a plurality of data fields and interface elements including a first interface button associated with a first action;
   (b) receiving, from the user via the touchscreen display of the electronic device, first touch input in the form of engagement by a first digit of the user with a portion of the touchscreen display displaying a first interface button of the interface elements;
   (c) updating the displayed graphical user interface of the software application to include
   (i) a first action confirmation area surrounding the first interface button, and
   (ii) a second action confirmation area surrounding the first action confirmation area;
   (d) while continuing to receive the first touch input, receiving, from the user via the touchscreen display of the electronic device, second touch input in the form of engagement by a second digit of the user with a portion of the touchscreen display displaying the first action confirmation area;
   (e) while continuing to receive the first touch input and the second touch input, receiving, from the user via the touchscreen display of the electronic device, third touch input in the form of engagement by a third digit of the user with a portion of the touchscreen display displaying the second action confirmation area;
   (f) in response to overlapping receipt of the first touch input, the second touch input, and the third touch input, effecting performance of the first action associated with the first interface button.

20. The method of claim 19, wherein the first action comprises a delete action.

\* \* \* \* \*